I. L. LONG.
TRANSMISSION FOR AUTOMOBILES.
APPLICATION FILED JAN. 14, 1918.
1,273,635.
Patented July 23, 1918.
2 SHEETS—SHEET 1.
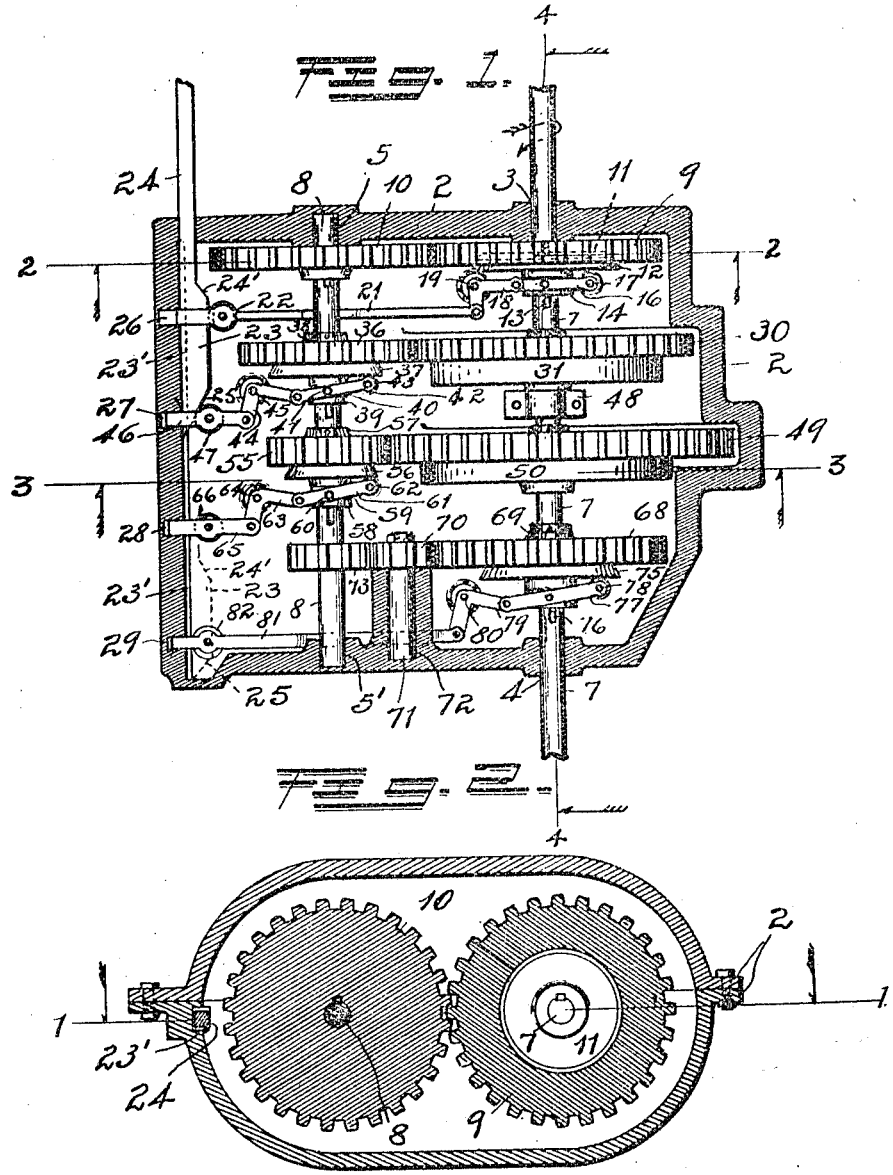

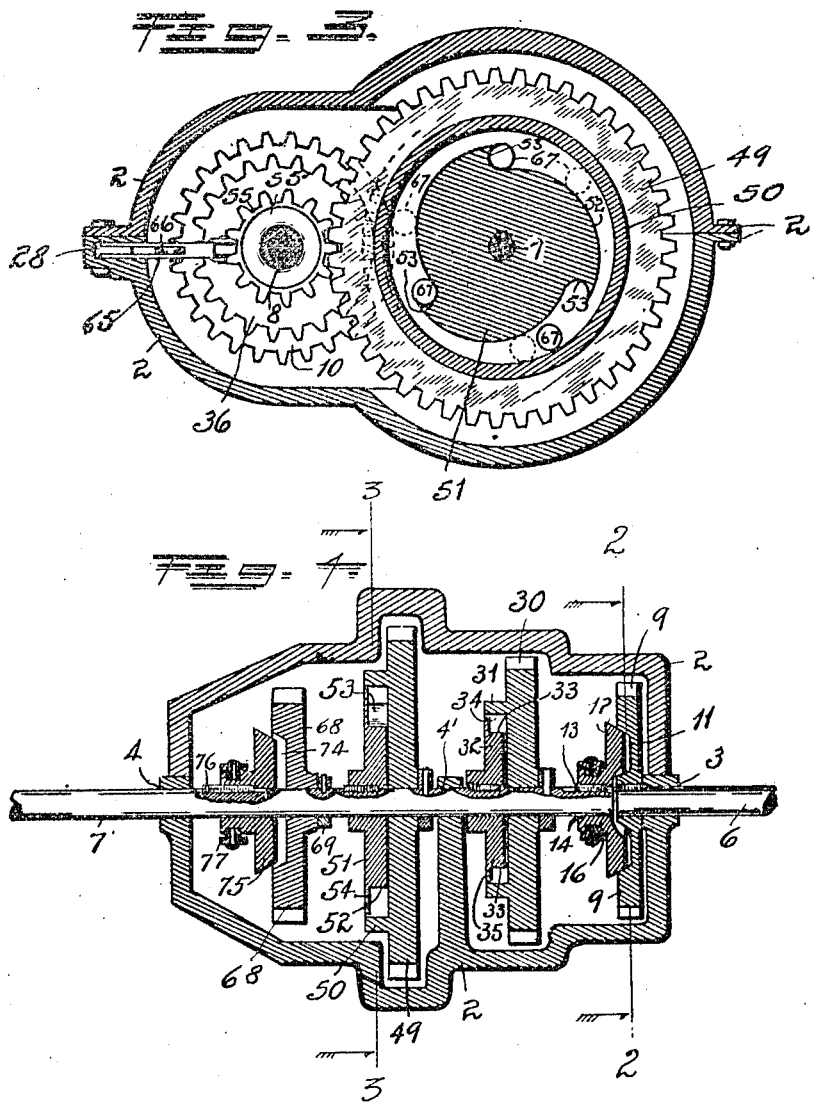

UNITED STATES PATENT OFFICE.

IRA L. LONG, OF MONMOUTH, ILLINOIS.

TRANSMISSION FOR AUTOMOBILES.

1,273,635.      Specification of Letters Patent.      Patented July 23, 1918.

Application filed January 14, 1918. Serial No. 211,809.

*To all whom it may concern:*

Be it known that I, IRA L. LONG, a citizen of the United States, residing at Monmouth, in the county of Warren and State of Illinois, have invented a new and useful Transmission for Automobiles, of which the following is a specification.

My invention relates to devices for transmitting motion from the engine-shaft or power-shaft through an intermediate or transmission-shaft to the wheel-driving shaft of a motor-propelled vehicle, and it consists, substantially, in the improvements hereinafter described and claimed.

The primary object of the invention is to generally improve and simplify the construction and to increase the utility and efficiency of devices of this character.

In the accompanying drawings, which illustrate a preferred form of my improvements:

Figure 1 is a top-plan, the housing in which the improvements are contained being shown in horizontal section, the plane thereof being taken in the line 1—1 in Fig. 2;

Fig. 2, a vertical section taken in the lines 2—2 in Figs. 1 and 4;

Fig. 3, a vertical section taken in the lines 3—3 in Figs. 1 and 4; and

Fig. 4, a vertical section taken in the line 4—4 in Fig. 1.

Considering the drawings in detail, 2 indicates a housing or transmission-case provided with bearings 3, 4, 4', 5 and 5'. 6 indicates the engine-shaft or power-shaft, mounted in the bearings 3; 7 denotes the wheel-driving shaft, mounted in the bearings 4, 4'; and 8 denotes the intermediate or transmission shaft, mounted in the bearings 5, 5'. 9 indicates a spur-wheel fixed on the shaft 6, and meshing therewith and driven thereby is a transmission-gear-wheel 10 fixed on the shaft 8. The spur 9 is provided with a cone-shaped recess 11 adapted to be frictionally engaged by a cone 12 slidably engaged with the shaft 7 by means of a spline 13. The hub 14 of the cone is provided with a peripheral groove 15 in which seats a shifting yoke 16 fulcrumed at 17, the other end of the yoke being pivoted to the weight arm of a bell-crank lever 18 having a pin-fulcrum 19. The power arm of the lever is pivotally connected to one end of an actuating-rod 21 having a bifurcated outer end in which is journaled a wheel 22 adapted to be moved by the boss or projection 23 of an operating-lever 24 which is slidable longitudinally in a groove 23' in the housing. Said boss is provided with beveled approach-faces 24' and 25'. The outer end of the rod 21 seats and moves in a pocket 26 in the housing. Similar pockets, presently again referred to, are indicated by 27, 28 and 29.

30 denotes a gear-wheel rotatably mounted on the shaft 7 and provided with an annular flange 31 in which is seated a disk 32 having a plurality of peripheral cam-faces 33 each of which terminates in a pocket 34, the cams and pockets being bounded by a ball-retaining flange 35. The teeth of the wheel 30 mesh with those of a gear-wheel 36 loosely mounted on the shaft 8 and provided in one of its faces with a recess adapted for the frictional engagement of a cone 37 splined on the same shaft, the cone and the wheel 36 thus constituting a friction-clutch. 38 denotes a collar. The hub 39 of the cone 37 has a peripheral groove 40 in which seats the pin 41 of a yoke 42 one end of which is fulcrumed at 43 to the housing and the other end of which is pivotally connected with the weight arm of a bell-crank lever 44 fulcrumed at 45 to the housing, the other arm of the bell-crank being pivotally connected with the inner end of an actuating-rod 46 the bifurcated end portion of which carries a wheel 47, the terminal of the rod seating in the pocket 27. 48 denotes a cap for the bearing 4'.

49 indicates a gear-wheel rotatably mounted on the shaft 7 and provided with an annular flange 50 in which is seated a disk 51 having a plurality of peripheral cams 52 each of which terminates in a pocket 53, the caps and pockets being bounded by a ball-retaining flange 54. (The parts 49—54 inclusive are structurally identical, except in size, with the parts 30—35 inclusive, and comparison of these, in the several figures of the drawing, will render the understanding of both more clear.) The teeth of the wheel 49 mesh with those of a gear-wheel 55 loosely mounted on the shaft 8 and provided in one of its faces with a recess 55' adapted for the frictional engagement of a cone 56 splined on said shaft, the cone and the wheel 55 thus constituting a friction-clutch. 57 denotes a collar. The hub 58 of the cone 56 has a peripheral groove 59 in which seats the pin 60 of a yoke 61 one end of which is fulcrumed at 62 to the housing and the other end of which is pivotally connected with the weight-arm of a bell-crank lever 63 fulcrumed at 64, the power-arm of the bell-crank being pivotally connected with the inner end of an actuating rod 65 having a bifurcated portion in which is mounted a wheel 66, the terminal of the rod seating in the pocket 28. 67, 67 indicate clutch-rollers or balls, duplicates of these being mounted between the disk 32 and flange 31.

68 denotes a reversing-gear-wheel rotatably mounted on the shaft 7, and 69 indicates a retaining-collar therefor. Said wheel meshes with a pinion 70 rotatably mounted on a stub-axle 71 seated in a pocket 72 in the housing. The pinion 70 meshes with a pinion 73 fixed on the shaft 8. The wheel 68 has in one of its faces a conical pocket 74 which is adapted to be frictionally engaged by a reversing-cone 75 held by a spline 76 from rotation but permitted thereby to slide longitudinally on said axle. The hub of said cone has a peripheral channel in which seats a yoke 77 one end of which is fulcrumed at 78 to the housing and the other end of which is pivoted to the weight-arm of a bell-crank lever 79 fulcrumed at 80 to the housing, its power-arm being pivoted to the inner end of an actuating-rod 81. The outer portion of said rod is forked and carries a wheel 82, its terminal seating in the pocket 29. It is to be noted that the boss 23 is sufficiently long to simultaneously engage two of the wheels 22, 47 and 66 but not 66 and 82.

In Fig. 1 the device is shown as in position to drive the shaft 7 direct from the shaft 6, for the lever-projection or boss 23 has moved the actuating-rod 21 inwardly and thereby thrown the cone 12 into frictional clutch-engagement with the spur 9, and as the cones 37, 56 and 75 are freed from their coacting clutch-members none of the parts controlled by them will have any effect on the shaft 7 which is thus driven by the connected cone 12. This is the highest speed position.

Now assume the lever to have been moved into such position that it has moved off from the wheel 22 and that it has moved back of and forced the wheel 47 and thereby the rod 46, bell-crank 44 and yoke 40 into positions to cause the cone 37 to frictionally engage its coacting clutch-member 36. The clutch 36—37 will impart movement in the contrary direction to the wheel 30, and because of the rotatory speed thus imparted thereto its flange 31 will cause the rollers to move out of the pockets 34 and to be bound between the cam-faces 33 and the interior wall of the flange 31, thus completing a three-roll drive or friction clutch which, through the instrumentality of the disk 32, drives the shaft 7. Because of the relative gear ratios of the gear wheel the shaft 7 will thus be driven at middle or second speed.

To drive at lowest speed the boss 23 is to be moved free from the wheel 47 and to so move the wheel 66, rod 65, bell-crank 63 and yoke 59 that they will throw the cone 56 into frictional contact with its coacting clutch-member 55 and thereby rotate it. Contrary movement will thus be imparted to the wheel 49 and its rotatory speed will cause the rollers 67 to move into the dotted line positions shown in Fig. 3, in which they are bound between the cam-faces 52 and the interior face of the flange 50, thus completing a three-roll drive or friction-clutch which, through the instrumentality of the disk 51, drives the shaft 7. This operation is of course a duplicate of that by which said shaft is driven by means of the disk 32, but owing to the difference in the ratios of the gears the shaft will in the last described operation be driven at a much slower rate of speed than when it was driven by said disk 32.

To reverse the direction of movement of the shaft 7 the boss 23 is moved to actuate the wheel 82, rod 81, bell-crank 79 and yoke 77 to thereby engage the cone 75 with its coacting clutch-member 68. The cones 37 and 56 being free or inactive, the shaft 8 will drive the pinion 73, and the direction of movement of the latter, through the interposition of the pinion 70, will be transmitted to the wheel 68 and through its fellow 75 the shaft 7 will be driven in like direction, which is contrary to the direction of movement of the engine shaft 6, and as indicated by the arrow on 7.

To place the parts in neutral or non-operative positions the boss 23 is to be moved to a position intermediate the wheels 66 and 82, but not actuating either of them. The wheel 9 will be driving the wheel 10 and thereby the shaft 8, pinions 73 and 70, and gear-wheel 68, but as the latter rotates loosely on the shaft 7 and its co-acting clutch-member 75 is inactive, no movement will be transmitted thereby to the shaft 7.

Should the boss 23 be moved into such position that it will simultaneously engage both wheels 22 and 47 both clutch-members 12 and 36 will be active. In this position the wheel 36 will drive the wheel 30, but not so rapidly as the engine-shaft is rotating, and the rollers in the flange 31 will merely roll or be inclined to remain in the pockets 34, for the disk 32 is rotating at a greater speed than the wheel 30. The shaft 7 is therefore driven by reason of the actuation of the wheel 22 and rod 21, and the devices will be running on "high."

Should the boss 23 be brought into position to simultaneously engage the wheels 47 and 66 the former will control the operation and the shaft 7 will be driven at second speed, for the same reasons described in describing the operations when the wheels 22 and 47 were simultaneously in operative positions.

No shock and no stripping of cogs will occur on starting, for the friction clutches will come gradually into action, slipping or yielding to some extent if necessary, to thereby obviate any jar or shock.

It will be observed that there is no shifting of gears whereby to strip, wear or mutilate the cogs. Also it will be noted that but one lever is required for the start, shift and reverse, and that the movement of this single lever is in a direct line.

Having thus described the nature of the invention I claim as new the following, to-wit:

1. Transmission mechanism comprising an engine-shaft, a spur-gear wheel fixed thereon, a transmission-shaft, a gear-wheel fixed thereon and constantly in mesh with the spur-wheel, a wheel-driving-shaft, a gear-wheel rotatable on the transmission-shaft, a clutch splined on the transmission-shaft and adapted to engage and drive the last recited wheel, and a clutch on the wheel-driving shaft, said clutch comprising a gear-wheel rotatably mounted on the wheel driving shaft and constantly in mesh with the clutch-driven wheel on the transmission shaft, and a clutch-member splined on the wheel-driving shaft and adapted to engage and be driven by the last recited gear-wheel.

2. Transmission mechanism comprising an engine-shaft, a spur-gear wheel fixed thereon, a transmission-shaft, a gear-wheel fixed thereon and constantly in mesh with the spur-wheel, a wheel-driving-shaft, a gear-wheel rotatable on the transmission-shaft, a clutch splined on the transmission shaft and adapted to engage and drive the last recited wheel, and a clutch on the wheel-driving shaft, said clutch comprising a gear-wheel rotatably mounted on the wheel driving shaft and constantly in mesh with the clutch-driven wheel on the transmission shaft, a clutch-member splined on the shaft and having a cam-face, and a roller interposed between said cam-face and a flange projection from said wheel, the rotary movement of projection binding the roller between it and said cam-face whereby said splined clutch-member will be rotated to thereby rotate the wheel-driving shaft.

3. Transmission mechanism comprising an engine-shaft, a transmission-shaft, a wheel-driving shaft, means whereby rotary motion is transmitted from the engine-shaft to the transmission-shaft, a gear-wheel adapted to be driven by the transmission-shaft, a gear-wheel rotatable on the wheel-driving shaft and in mesh with said gear-wheel, and having an annular flange on one of its faces, a disk splined on the wheel-driving shaft and having a cam-face, and a roller interposed between the interior face of said flange and said cam-face and adapted to coact with both to form a clutch whereby the wheel-driving shaft may be rotated.

4. In mechanism of the character described, a housing, an engine-shaft having a bearing therein, a gear-wheel fixed on said shaft, a transmission-shaft having bearings in the housing, a gear-wheel fixed thereon and constantly in mesh with the engine-shaft gear-wheel, a clutch-member adapted to engage and be driven by the engine-shaft gear-wheel, a wheel-driving shaft, a plurality of change-speed gear-wheels mounted in coacting pairs on the transmission-shaft and wheel-driving shaft, clutch-members for engaging said pairs at will, and a single operating-lever for progressively controlling the clutch members.

5. In mechanism of the character described, a housing, an engine-shaft having a bearing therein, a gear-wheel fixed on said shaft, a transmission-shaft having bearings in the housing, a gear-wheel fixed thereon and constantly in mesh with the engine shaft gear-wheel, a clutch-member adapted to engage and be driven by the engine-shaft gear-wheel, a wheel-driving shaft, a plurality of change-speed gear-wheels mounted in coacting pairs on the transmission-shaft and wheel-driving shaft, clutch-members for engaging said pairs at will, a reverse-gear-wheel rotatably mounted on the wheel-driving shaft, a clutch member on the same shaft with and adapted to engage the reverse-gear-wheel, and a single operating-lever for selectively controlling said clutch-members.

IRA L. LONG.